United States Patent
Green

(10) Patent No.: US 11,230,830 B2
(45) Date of Patent: Jan. 25, 2022

(54) SELF-CHARGING BATTERY-POWERED STOP VALVE WITH ELONGATED WIRELESS FOOT SWITCH

(71) Applicant: Ronald David Green, Santa Cruz, CA (US)

(72) Inventor: Ronald David Green, Santa Cruz, CA (US)

( * ) Notice: Subject to any disclaimer, the term of this patent is extended or adjusted under 35 U.S.C. 154(b) by 49 days.

(21) Appl. No.: 16/877,340

(22) Filed: May 18, 2020

(65) Prior Publication Data

US 2020/0385965 A1 Dec. 10, 2020

Related U.S. Application Data

(63) Continuation-in-part of application No. 15/912,351, filed on Mar. 5, 2018, now abandoned.

(51) Int. Cl.

| E03C 1/05 | (2006.01) |
| G08C 17/02 | (2006.01) |
| F03B 13/00 | (2006.01) |
| H02K 7/18 | (2006.01) |
| H02K 11/00 | (2016.01) |
| F16K 31/06 | (2006.01) |

(52) U.S. Cl.
CPC .............. *E03C 1/055* (2013.01); *F03B 13/00* (2013.01); *F16K 31/0644* (2013.01); *G08C 17/02* (2013.01); *H02K 7/1823* (2013.01); *H02K 11/0094* (2013.01)

(58) Field of Classification Search
CPC E03C 1/052; E03C 1/057; E03C 1/05; H02K 7/18; H02K 11/00; G08C 17/02; F03B 13/00

USPC .................................. 251/129.04; 4/619, 623
See application file for complete search history.

(56) References Cited

U.S. PATENT DOCUMENTS

| 3,536,294 A | * | 10/1970 | Rodriguez | ............... F16K 31/62 251/41 |
| 4,606,085 A | * | 8/1986 | Davies | ................... A61B 90/80 4/619 |
| 5,199,119 A | * | 4/1993 | Weber | ..................... E03C 1/052 251/295 |
| 5,226,629 A | * | 7/1993 | Millman | ................. E03C 1/055 137/606 |
| 5,511,763 A | | 4/1996 | Green | |

(Continued)

*Primary Examiner* — Justin M Jonaitis
(74) *Attorney, Agent, or Firm* — Patrick Reilly

(57) ABSTRACT

A water-control system has a faucet, a base unit having at least one normally-open solenoid-operated valve coupled to a water inlet fitting and a water outlet fitting, control circuitry, and a first antenna, and an elongated foot switch, having a normally-open contact element, a battery, and circuitry including a second antenna. A water-supply conduit is coupled to the water-inlet fitting of the solenoid-operated valve, and a water line is connected between the water-outlet fitting of the solenoid-operated valve and a fitting at the adjustable faucet, and wherein, with the faucet open and water flowing from the faucet, stepping on the foot switch closes the normally-open contact element, causing a signal to be sent wirelessly from the elongated foot switch to the solenoid control circuitry, causing the solenoid-operated valve to close, stopping water flow from the faucet, and releasing the foot switch allows water flow to resume.

15 Claims, 9 Drawing Sheets

(56) References Cited

U.S. PATENT DOCUMENTS

| | | | | |
|---|---|---|---|---|
| 5,699,833 | A | * | 12/1997 | Tsataros ................ E03C 1/057 137/624.11 |
| 6,047,417 | A | * | 4/2000 | Derakhshan ............ E03C 1/052 137/599.03 |
| 6,219,859 | B1 | * | 4/2001 | Derakhshan ............ E03C 1/052 137/599.01 |
| 2003/0033669 | A1 | * | 2/2003 | Fernie ...................... E03C 1/14 4/619 |
| 2011/0275027 | A1 | * | 11/2011 | Lint ...................... A61C 1/0015 433/101 |
| 2012/0255116 | A1 | * | 10/2012 | Houghton .............. E03C 1/057 4/623 |

* cited by examiner

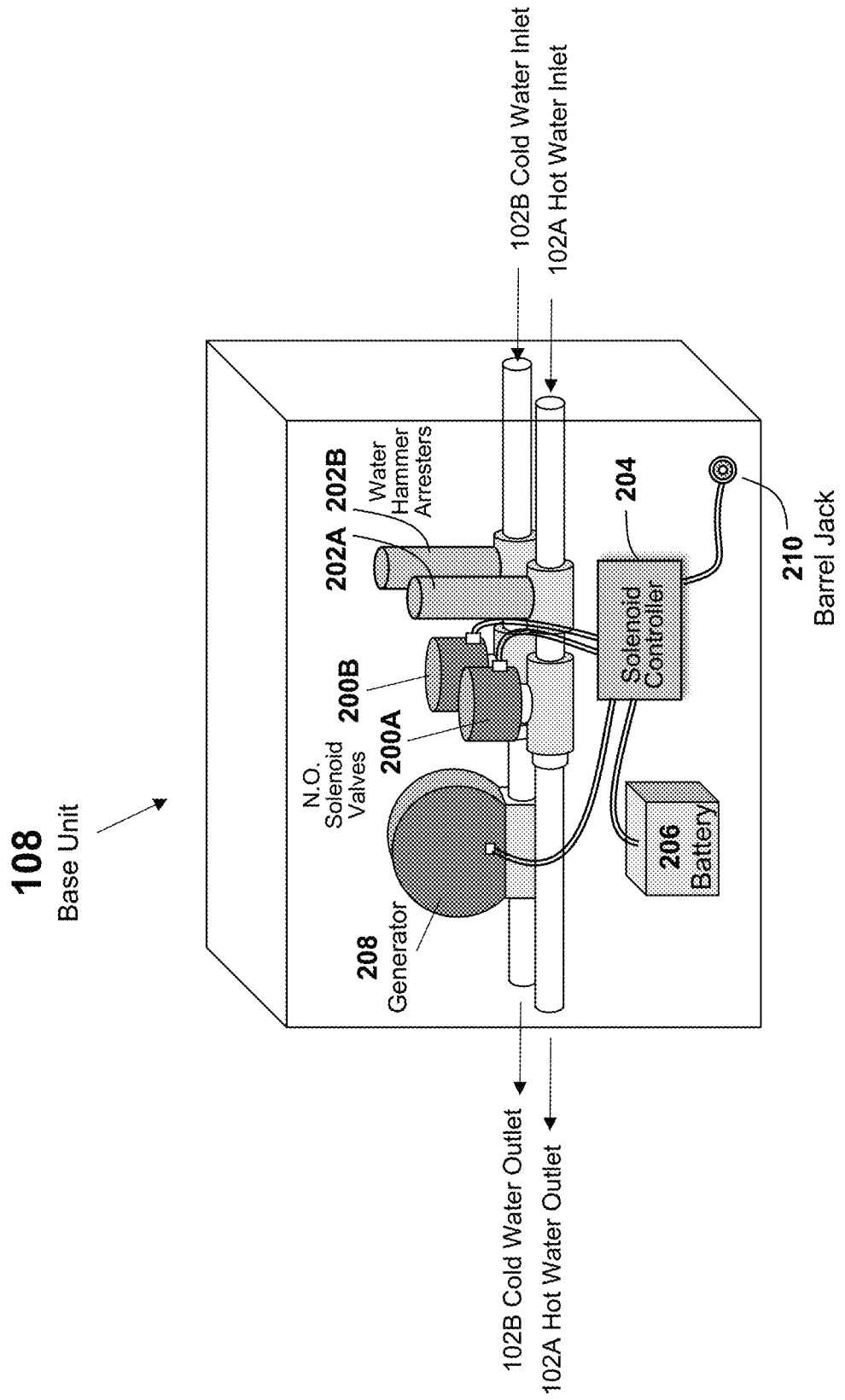
FIG. 2 – Base Unit Components

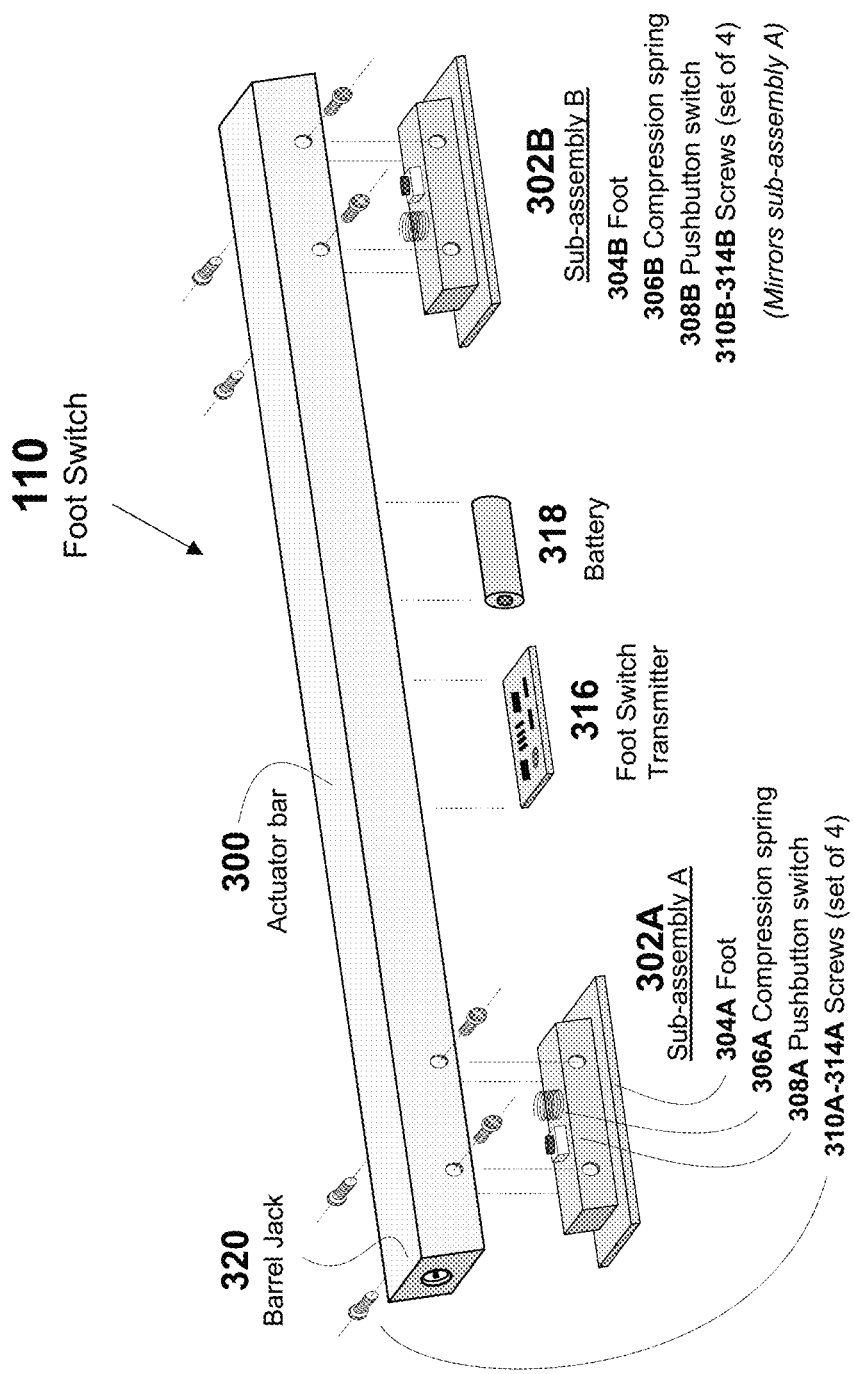
FIG. 3A – Foot Switch Exploded View

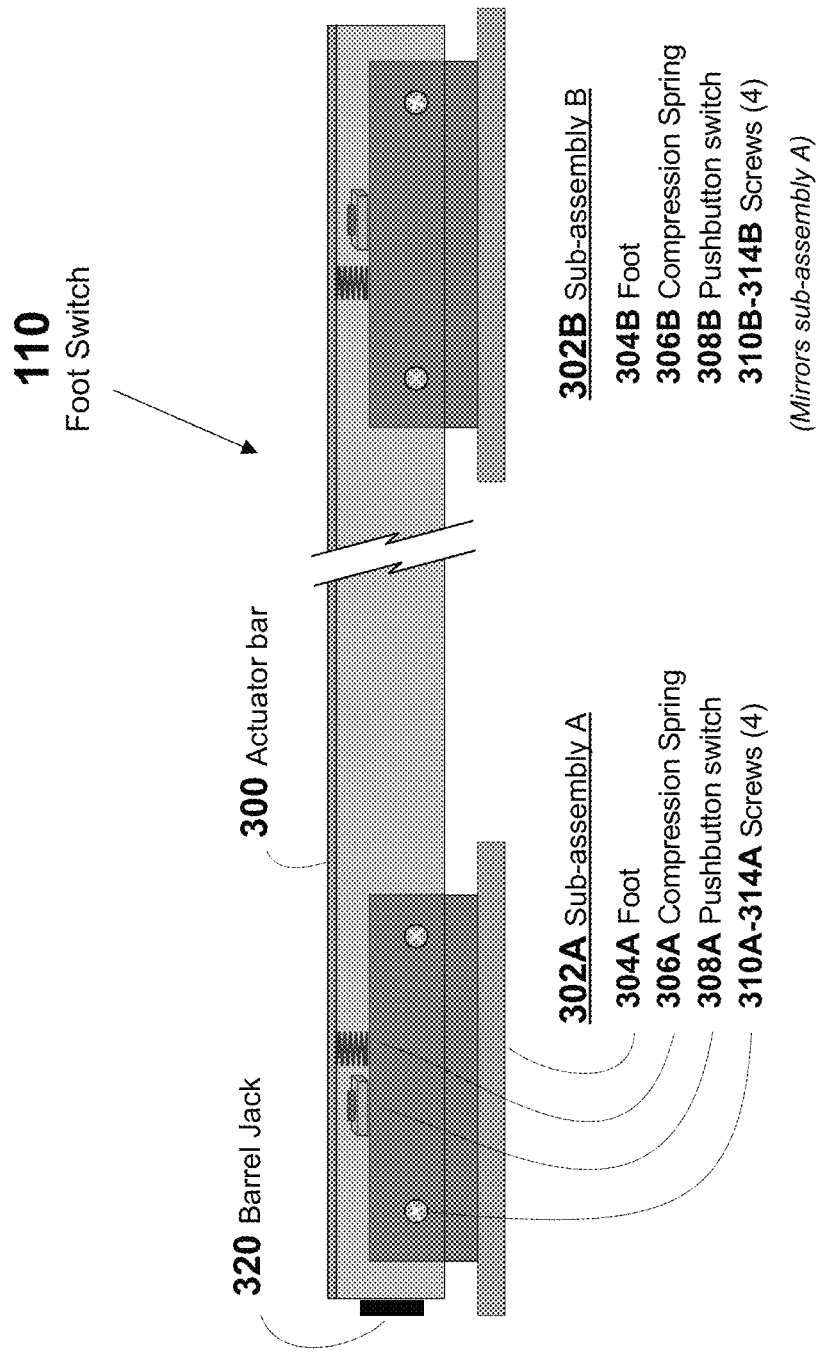
FIG. 3B – Foot Switch Profile View

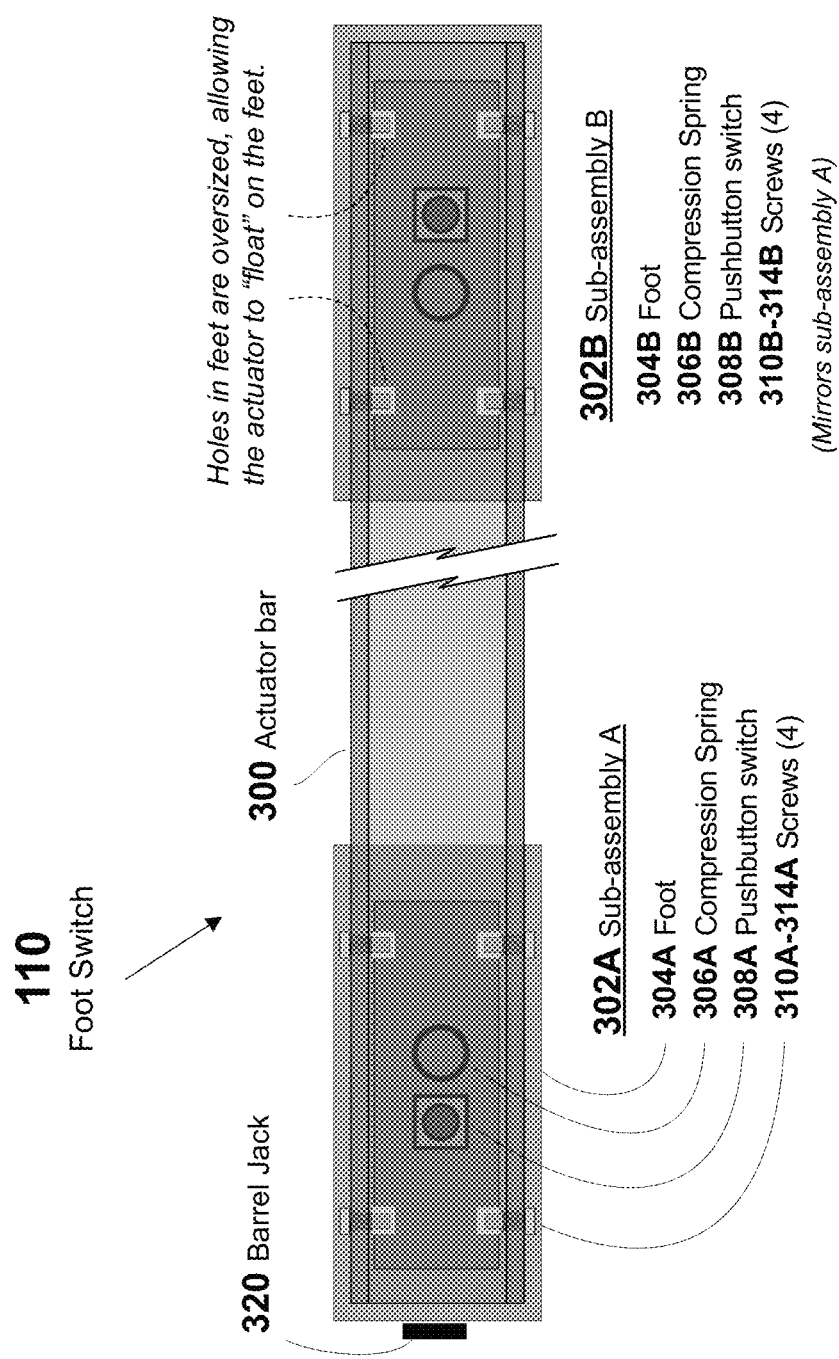
FIG. 3C – Foot Switch Top View

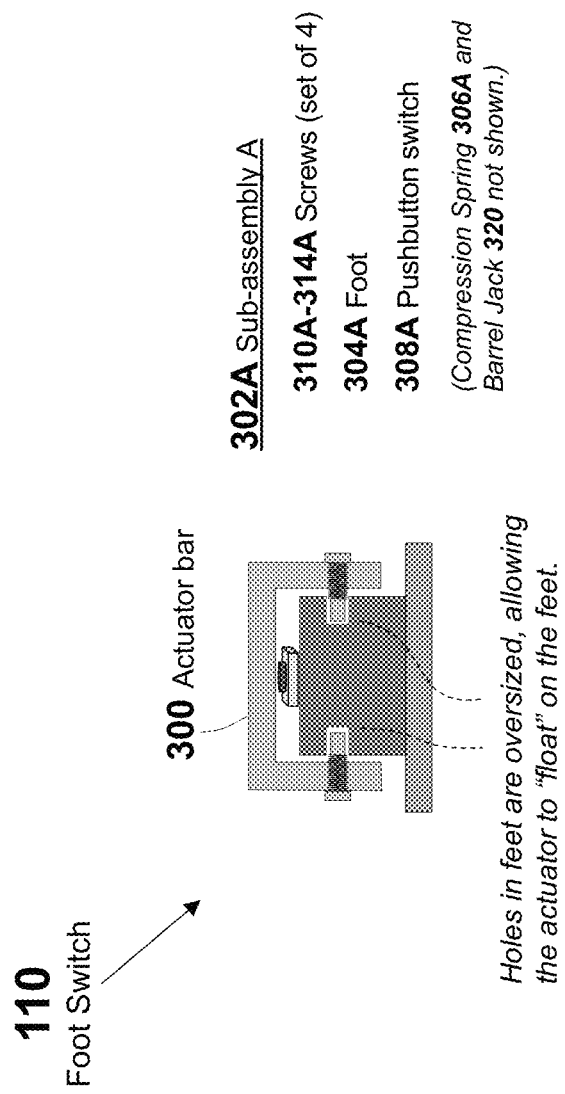
FIG. 3D – Foot Switch End View

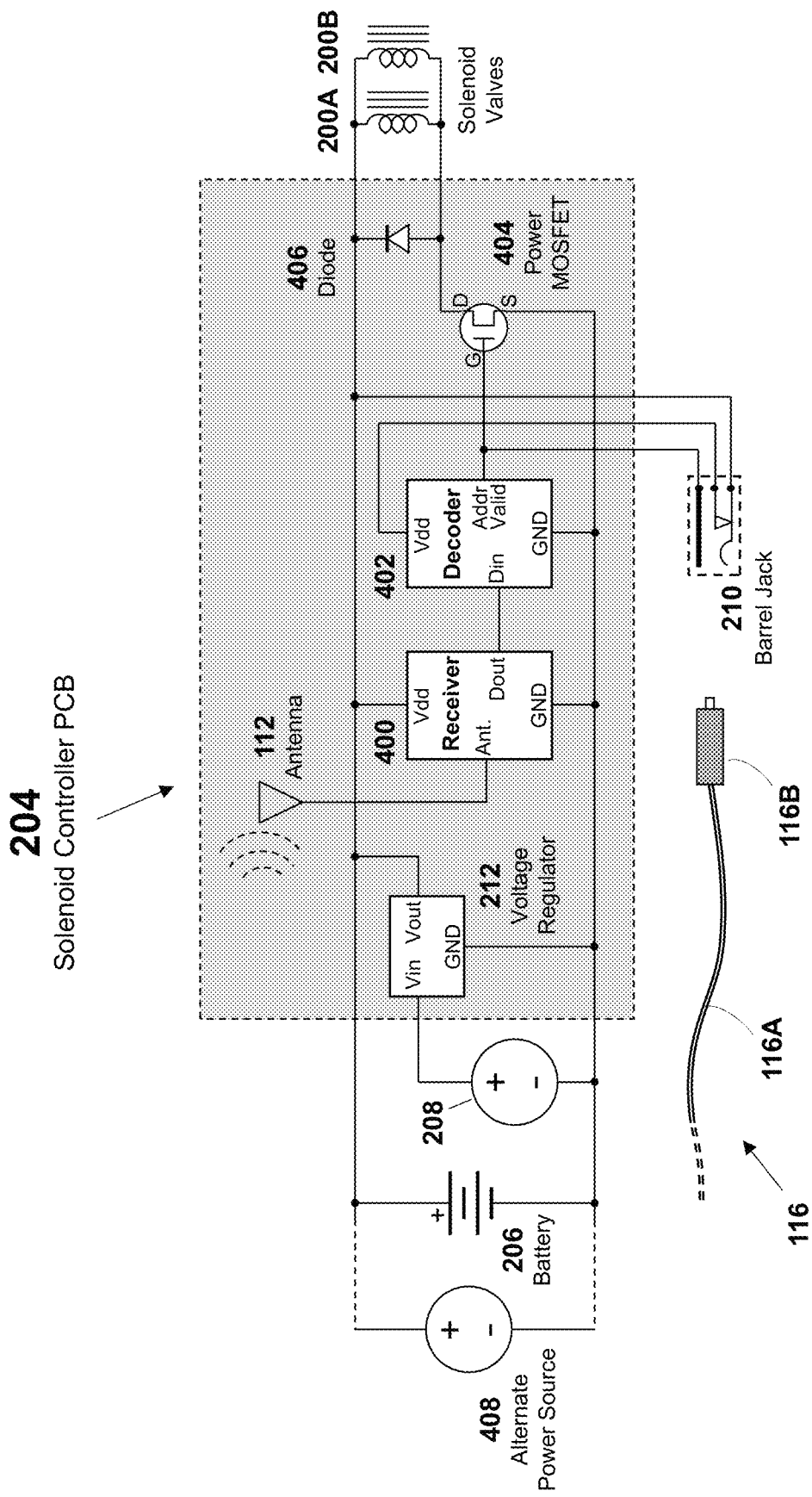
FIG. 4 – Solenoid Controller Schematic

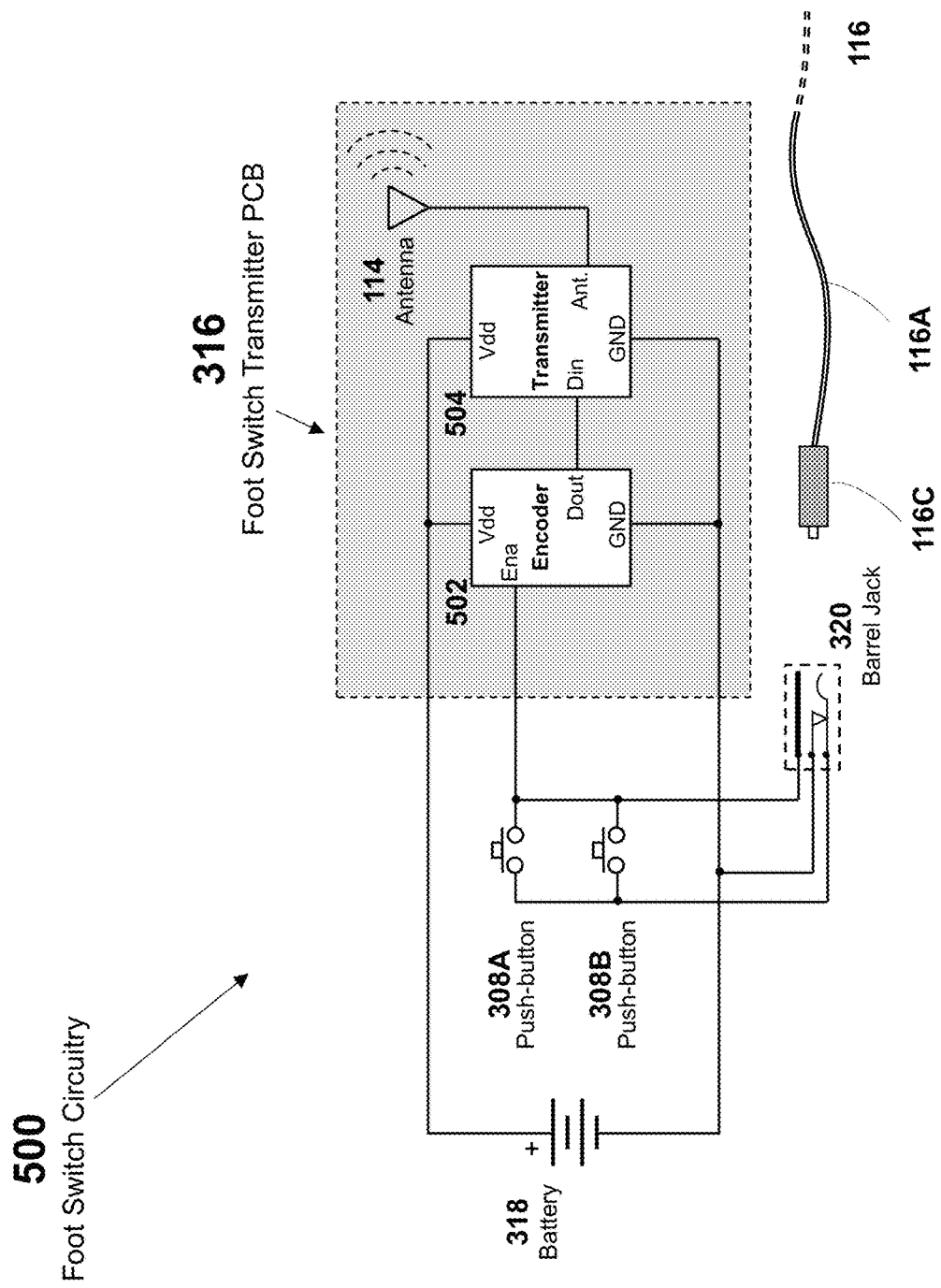
FIG. 5 – Foot Switch Transmitter Schematic

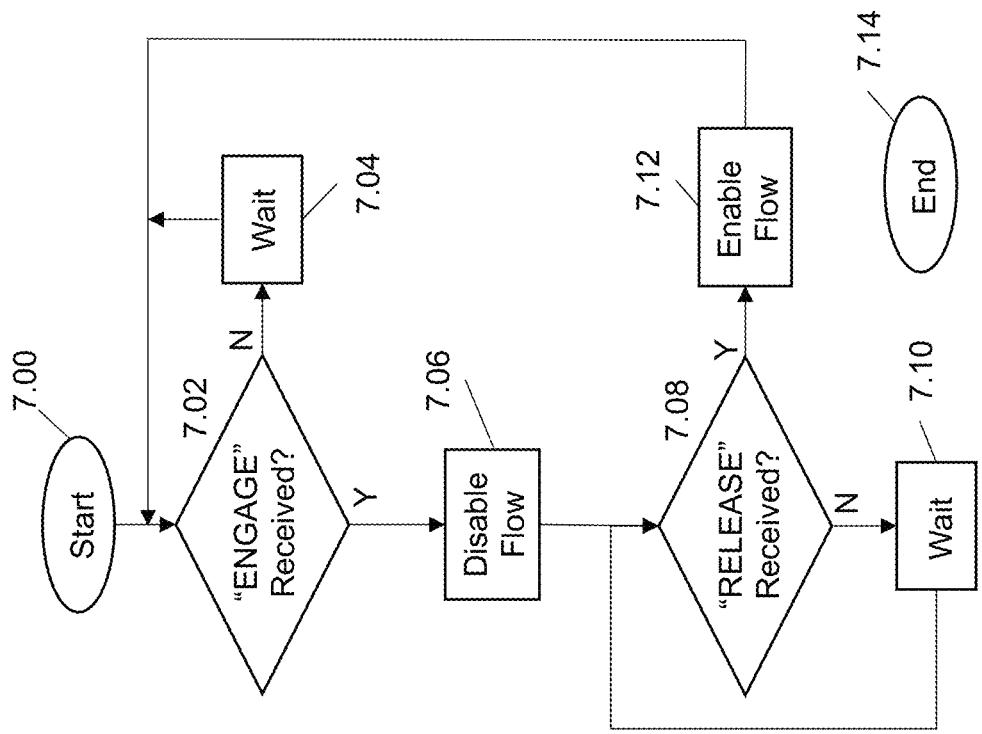
FIG. 7 – Base Unit Side
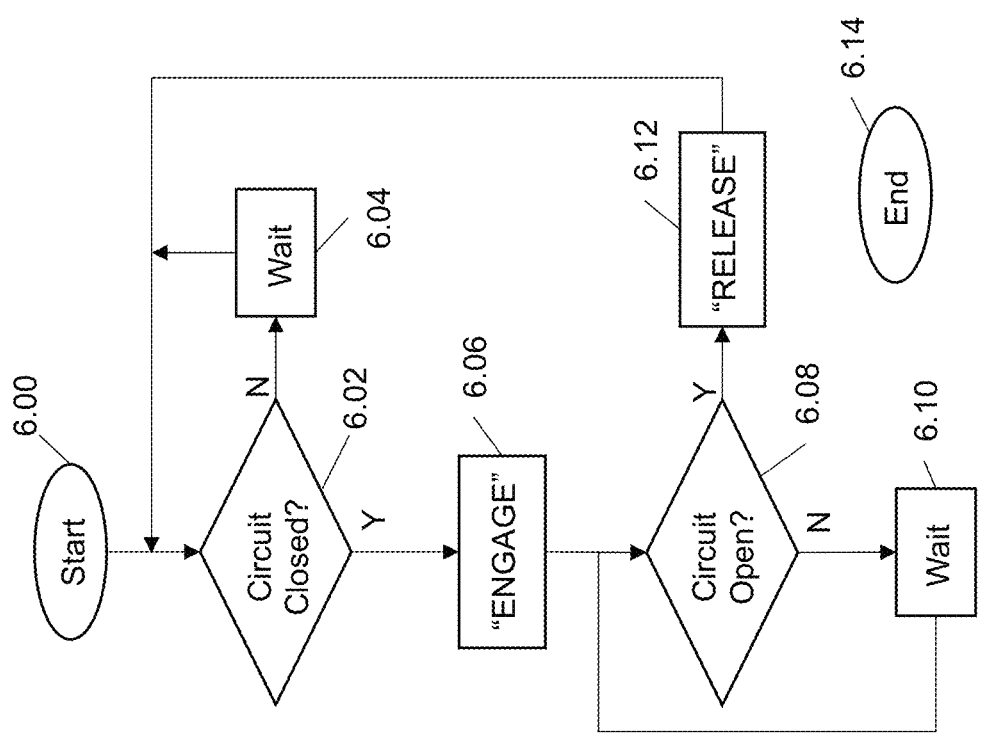
FIG. 6 – Foot Switch Side

SELF-CHARGING BATTERY-POWERED STOP VALVE WITH ELONGATED WIRELESS FOOT SWITCH

This Nonprovisional Patent Application is a Continuation-in-Part Patent Application to Nonprovisional patent application Ser. No. 15/912,351 as filed on Mar. 5, 2018 by Inventor Ronald David Green. Provisional patent application Ser. No. 15/912,351 is hereby incorporated into its entirety and for all purposes into the present disclosure.

FIELD OF THE INVENTION

The present invention is in the technical area of plumbing equipment, and pertains more particularly to control of hot and cold water associated with faucets and sinks.

BACKGROUND OF THE INVENTION

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

Foot pedals for water control are well-known in the art. There were twenty-two US patents granted in this area between 1991 and 2017, with many earlier examples. The purpose of these devices is to control water flow using the feet, in order to achieve goals of sanitary operation and water conservation.

The dispensing aspect of prior designs is important when examining prior art. A typical sink faucet may be considered a dispensing device: the default state of the mechanism is off, and the user engages the device (i.e., opens a valve) to get water. Similarly, a foot-pedal device is a dispensing mechanism: the user engages the device (i.e., steps on a switch or pedal) to get water. The basic function of dispensing is the defining characteristic of all faucets, including those that are manually operated (by hand), foot-operated, and electronic or sensor-based.

In contrast, a foot-operated stop valve is not a dispensing mechanism. The purpose of a foot-operated stop valve is to interrupt the flow of water, not enable it. The design is implemented with normally-open (N.O.) valves. These are valves that are open in their default state, allowing water to flow. Engaging the device (stepping on the switch) closes the valves and suspends (temporarily stops) the flow of water. This design for suspending flow is the defining characteristic of the foot-operated stop valve and differentiates it from dispensing mechanisms.

A review of prior art by the inventor, including US and foreign patents, commercial products, and online resources has revealed no other foot-operated devices designed to achieve a suspend function. This function is described only in U.S. Pat. No. 5,511,763, issued to the present inventor in 1996. The device described and claimed in U.S. Pat. No. 5,511,763 has some drawbacks, which are remedied by elements and functions of the present invention.

SUMMARY OF THE INVENTION

The basic elements of the current invention will be readily understood by those with normal skill in the art.

The invention is preferably comprised of a Base Unit, a Foot Switch, and a Power Source that is installed in a position to control the flow in one or more pipes transporting liquid, such as plumbing that supplies running water to a household. The Base Unit comprises a valve assembly for each pipe the device controls, each assembly consisting of a normally-open solenoid valve with an attached water hammer arrestor. These valve assemblies are inserted one each into the pipes being controlled, such as hot and cold supply lines to a sink faucet. The solenoids are wired in parallel and connected to control circuitry comprising power-switching elements and an antenna for receiving signals wirelessly. The Base Unit is powered by a battery which drives the solenoids and related circuitry. The battery in turn is charged by a water-powered generator that is inserted into one of the water lines. This allows the battery to be re-charged while water is running, removing the need for an external power supply.

The Foot Switch sends signals wirelessly to the Base Unit. When the switch is pressed it commands the Base Unit to close the solenoids, stopping the flow of water. When the Foot Switch is released, the solenoid valves open, allowing water flow to resume.

The Foot Switch is comprised of an arbitrarily long actuator bar with at least two attached feet, a circuit board for generating wireless signals, an antenna, and a battery. Each of the attached feet contains a momentary-contact push-button switch; the switches are wired in parallel and connected to the circuit board. This implementation of the Foot Switch with push-button switches at each end of the actuator allows the actuator to be arbitrarily long: if the actuator is pressed anywhere along its length, at least one of the switches will close completing the circuit. The Foot Switch also can be directly connected to the Base Unit via an optional cable.

Arbitrary foot pedal length of the present invention may provide at least the benefit of increased accessibility and ease of use. The foot pedal is less likely to fail to trigger simply because a user did not step on exactly the right spot on the foot pedal, or did not step firmly enough. Multiple switches may also provide redundancy; if one switch should break, the device remains operable, if perhaps not as easily, by means of the other until the broken switch can be fixed.

The various components of the invention may be made of any suitable materials as known in the art, to include molded plastic, 3D-printed material, metal, wood, and so on, following obvious limitations of material suitability as known in the art, such as that certain components of the invention depend on various degrees of conduction of electricity or a suitable equivalent means of transmitting signals and/or powering motion.

While a household sink presents a simple example environment as to how the present invention works, it would be understood by one skilled in the art that possible applications of the present invention are numerous and varied, as ease of access to running water is widely applicable.

The invention has the advantage that it is compact and easy to retrofit into any existing sink cabinet. The combination of a generator and battery allows the device to be used without an external power supply. The wireless configuration provides for easy installation with minimal impact to existing cabinets and fixtures. The elongated Foot Switch is convenient because it provides a target for the foot that is easy to find without looking, yet it is slim enough to sit unobtrusively in the toe kick space of a kitchen or bathroom sink cabinet. The "dual connectivity mode" of the footswitch allows the user to choose between wireless operation, which is more convenient; or a direct-connection which saves batteries and is more economical.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

INCORPORATION BY REFERENCE

All publications mentioned herein are incorporated herein by reference to disclose and describe the methods and/or materials in connection with which the publications are cited. All publications, patents, and patent applications mentioned in this specification are herein incorporated by reference in their entirety and for all purposes to the same extent as if each individual publication, patent, or patent application was specifically and individually indicated to be incorporated by reference.

The publications discussed or mentioned herein are provided solely for their disclosure prior to the filing date of the present application. Nothing herein is to be construed as an admission that the present invention is not entitled to antedate such publication by virtue of prior invention. Furthermore, the dates of publication provided herein may differ from the actual publication dates which may need to be independently confirmed.

U.S. Pat. No. 5,511,763 issued on Apr. 30, 1996 to Inventor Ronald D. Green is fully incorporated into the present disclosure in its entirety and for all purposes.

BRIEF DESCRIPTION OF DRAWINGS

The detailed description of some embodiments of the invention is made below with reference to the accompanying figures, wherein like numerals represent corresponding parts of the figures.

FIG. 2 is a block diagram of the Base Unit of the system of FIG. 1.

FIG. 3A is an exploded view diagram of the Foot Switch of the system of FIG. 1.

FIG. 3B is a profile view diagram of the Foot Switch of the system of FIG. 1.

FIG. 3C is a top view diagram of the Foot Switch of the system of FIG. 1.

FIG. 3D is an end view diagram of the Foot Switch of the system of FIG. 1.

FIG. 4 is a circuit diagram for a solenoid controller in the system of FIG. 1.

FIG. 5 is a circuit diagram for a Foot Switch transmitter in the system of FIG. 1.

FIG. 6 is a process chart representing operation of the circuit board of the Foot Switch transmitter of FIG. 5.

FIG. 7 is a process chart representing operation of the circuit board of the solenoid controller of FIG. 4.

Figure 1:
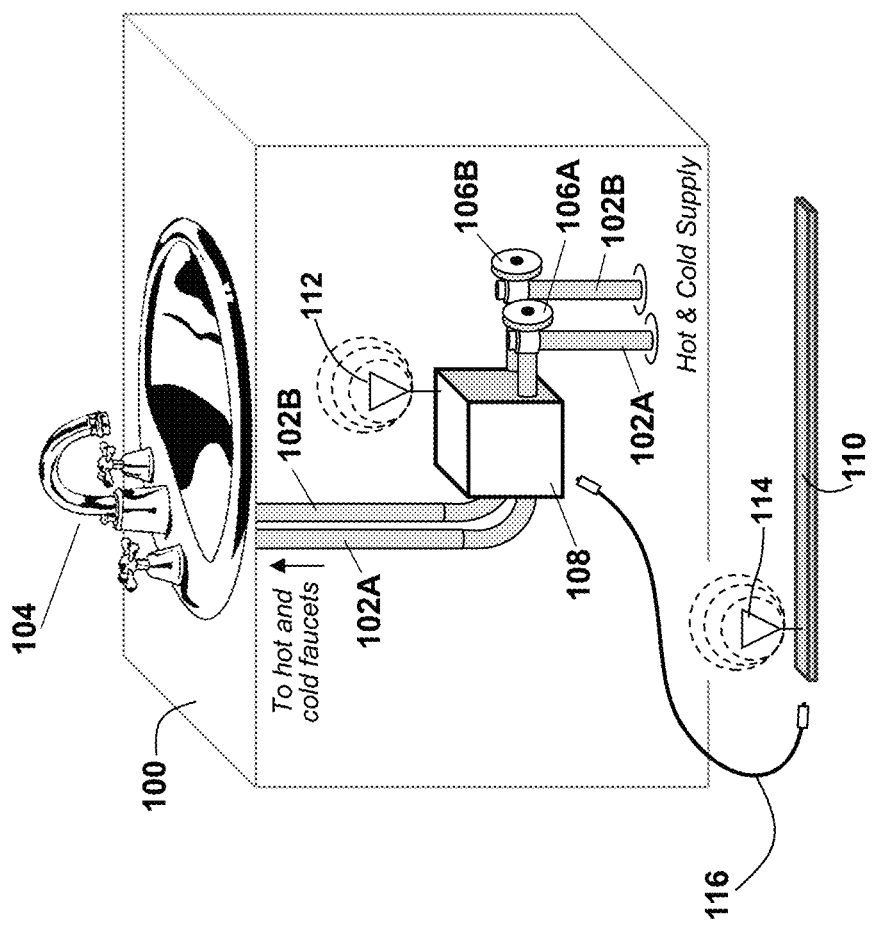
FIG. 1 is a block diagram presenting system components installed in a typical sink vanity cabinet, in an embodiment of the invention.

LIST OF REFERENCE NUMERALS
ASSOCIATED WITH DRAWINGS

100 Sink vanity cabinet
102A Hot water line
102B Cold water line
104 Sink faucet
106A Hot water shutoff valve
106B Cold water shutoff valve
108 Base Unit
110 Foot Switch
112 Base Unit antenna (receiver)
114 Foot Switch antenna (transmitter)
116 optional signal cabling
116A signal cable
116B first barrel end
116C second barrel end
200A, 200B Normally-open solenoid valves
202A, 202B Water hammer arresters
204 Solenoid Controller circuit board
206 Base Unit battery
208 Generator
210 Base Unit barrel jack
212 Voltage Regulator
300 Actuator bar
302A, 302B Foot Switch sub-assemblies
304A, 304B Feet
306A, 306B Compression springs
308A, 308B Pushbutton switches
310A-314A, 310B-314B Screws
316 Foot Switch transmitter circuit board
318 Foot Switch battery
320 Foot Switch barrel jack
400 Receiver module
402 Decoder module
404 Power MOSFET transistor
406 Diode
408 Alternate Power Source
500 Foot Switch Circuitry
502 Encoder module
504 Transmitter module

DETAILED DESCRIPTION OF DRAWINGS

In the following detailed description of the invention, numerous details, examples, and embodiments of the invention are described. However, it will be clear and apparent to one skilled in the art that the invention is not limited to the embodiments set forth and that the invention can be adapted for any of several applications.

It is to be understood that this invention is not limited to particular aspects of the present invention described, as such may, of course, vary. It is also to be understood that the terminology used herein is for the purpose of describing particular aspects only, and is not intended to be limiting, since the scope of the present invention will be limited only by the appended claims. Methods recited herein may be carried out in any order of the recited events which is logically possible, as well as the recited order of events.

Where a range of values is provided herein, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, the methods and materials are now described.

It must be noted that as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only" and the like in connection with the recitation of claim elements, or use of a "negative" limitation.

When elements are referred to as being "connected" or "coupled" the elements can be directly connected or coupled together, or one or more intervening elements may also be present. In contrast, when elements are referred to as being "directly connected" or "directly coupled," there are no intervening elements present.

Throughout this specification, like reference numbers signify the same elements throughout the description of the figures.

Referring now generally to the Figures and particularly to FIG. 1, FIG. 1 shows major components of the invented system in one embodiment, as installed into an ordinary sink vanity cabinet 100 having hot and cold water lines 102A & 102B which supply running water to a sink faucet 104 and may include shutoff valves 106A & 106B to prevent the flow of water in the lines 102A & 102B. A Base Unit 108 of the invention is inserted into the water lines 102A & 102B between the shutoff valves 106A & 106B and the faucet 104, by connecting the incoming hot-water and cold-water lines 102A & 102B to the Base Unit 108, and connecting outlets of the Base Unit 108 to the water lines 102A & 102B proceeding to the sink faucet 104 component(s) of the sink vanity cabinet 100. The system includes a Foot Switch 110, which communicates with the Base Unit 108. The Foot Switch 110 can communicate to the Base Unit 108 wirelessly via a Base Unit antenna 112 and a Foot Switch antenna 114 or can be directly connected using an optional signal cabling 116. The optional signal cabling may include at least a length of signal cable 116A, capped at a first end with a first barrel connector 116B and at a second end with a second barrel connector 116C. The first barrel connector 116B and the second barrel connector 116C may be identical connectors.

Referring now generally to the Figures and particularly to FIG. 2, FIG. 2 shows several key components of the Base Unit 108, which include two normally-open solenoid valves 200A & 200B, and may preferably also include two water hammer arresters 202A & 202B, used to suppress a loud bang that may occur when one or more of the solenoid valves 200A & 200B closes quickly and interrupts water flow. In this implementation the first solenoid 200A is connected to the first arrester 202A, and the second solenoid 200B is connected to the second arrester 202B. The Base Unit 108 also includes a solenoid controller circuit board 204 which drives the solenoids 200A & 200B and connects to a Base Unit battery 206 and a generator 208. The solenoid controller circuit board 204 may include a barrel jack 210 that provides a direct-connect option for the Foot Switch cable 116. The Base Unit antenna 112 is shown symbolically, as this component is actually a short length of wire on the solenoid controller circuit board 204. The Base Unit 108 is powered by the Base Unit battery 206 which is recharged by the generator 208. The generator 208 is preferably a water-powered generator inserted into one of the water supply lines. When water is flowing through the generator 208, the Base Unit battery 206 is charged through a voltage regulator 212 (as shown in FIG. 4). In other embodiments, a different power source may be used in place of a water-powered generator as found suitable, such as an AC adapter that plugs into a wall socket, or a generator that generates power by other means known in the art.

Referring now generally to the Figures and particularly to FIG. 3A, FIG. 3A shows the Foot Switch 110 in exploded view. The Foot Switch 110 comprises an actuator bar 300 of any length, with at least two feet consisting of sub-assemblies 302A & 302B, one at each end of the actuator bar 300. The foot sub-assemblies 302A & 302B are identical to each other and each respectively include a foot 304A & 304B; a compression spring 306A & 306B; a pushbutton switch 308A & 308B, and a set of four screws each 310-314A & 310-314B. The two pushbutton switches 308A & 308B are wired in parallel and connected to a transmitter board 316 powered by a Foot Switch battery 318. The positioning of the pushbutton switches 308A & 308B at either end of the actuator bar 300 allows the actuator bar 300 to be any arbitrary length. If the actuator bar 300 is pressed anywhere along its length, at least one of the pushbutton switches 308A & 308B will close, completing the circuit. The Foot Switch 110 may also include a barrel jack 320 to interface with the barrel end 116B or 116C of the optional signal cabling 116.

Referring now generally to the Figures and particularly to FIG. 3B, FIG. 3B shows the Foot Switch 110 in Profile View. This view shows the position of the pushbutton switches 308A & 308B, and the position of the compression springs 306A & 306B.

Referring now generally to the Figures and particularly to FIG. 3C, FIG. 3C shows the Foot Switch 110 from the Top View. This view shows a detail of the four sets of screws 310A-314A & 310B-314B belonging to each sub-assembly 302A & 302B. These screws 310A-314A & 310B-314B tighten into the actuator bar 300, but do not tighten into the foot sub-assemblies 302A & 302B. The holes in the foot sub-assemblies are oversized holes, allowing the actuator bar 300 to "float" on the feet 304A & 304B. This provides enough freedom of motion to allow the pushbuttons 308A & 308B to remain open except when the actuator bar 300 is pressed.

Referring now generally to the Figures and particularly to FIG. 3D, FIG. 3D shows the Foot Switch 110 from an End View. This view is provided for completeness and shows how the set screws 33A & 33B sit in oversized holes in the foot sub-assemblies 302A & 302B, allowing the actuator bar 300 to "float" on the feet 34A & 34B.

Referring now generally to the Figures and particularly to FIG. 4, FIG. 4 shows a circuit diagram for one embodiment of solenoid controller circuit board 204, which comprises the Base Unit antenna 112, a receiver module 400, a decoder module 402, a power MOSFET transistor 404, a flyback diode 406, the solenoid valves 200A & 200B (inductive loads), and the barrel jack 210 for interfacing with one of the two barrel connectors 116B or 116C of the signal cabling 116.

The MOSFET transistor 404 is used to turn on the solenoid valves 200A and 200B. The flyback diode 406 (a.k.a. snubber, kickback, etc.) is used to eliminate a voltage spike that occurs across an inductive load when the power is cut. This combination of a power transistor and diode to control solenoids is a widely used practice.

The solenoid controller circuit board 204 may be powered by any suitable means known in the art, including multiple power sources used individually, alternatively, or in concurrence. Presented in the diagrammed circuit is the Base Unit battery 206 as described herein, wired in parallel with an alternate power source 408 such as an AC wall adapter, backup disposable power cell, additional generator, or any other suitable means of supplying device power known in the art. It should additionally be understood that the single alternate power source 408 presented here may stand in for any kind of additional power source, and any number of additional power sources that may be likewise wired in parallel.

The receiver module 400 in this embodiment is a commercially available radio frequency (RF) mini-PCB designed to detect Amplitude Shift Keying (ASK) modulated signals in the 433 MHz (or 315 MHz) band, such as a model XY-MK-5V marketed by the UCEC company of Arvada, Colo., or any similar suitable device known in the art. Similarly, the Decoder Module 402 is a commercially available integrated circuit (IC) designed to de-serialize a data stream (bit-stream) and decode an address such as a model HT-12D as marketed by Holtek Semiconductor Inc. of Taipei, Taiwan, or any similar suitable device known in the art. The receiver and decoder are configured to work as a paired set. In this embodiment, the receiver generates a bit-stream for the decoder which is looking for a valid address. If the correct address is detected, the IC outputs a logic true signal on its "Addr Valid" pin. A valid address enables the MOSFET transistor 404 and energizes the solenoid valves 200A & 200B.

This circuit is powered by the Base Unit battery 206. The Base Unit battery 206, in turn, is charged by the water-powered generator 208, such as a Yosoo DC Water Turbine Generator Water 12V DC 10W Micro-Hydro Water Charging Tool as marketed by Amazon of Seattle, Wash., which is inserted into one of the water lines 102A & 102B and charges the Base Unit battery 206 while water is flowing. The voltage regulator 212, such as a model S-1142CC5I-E6T1U as marketed by ABLIC, Inc. of Chiba, Japan or any similar suitable device known in the art, is used to limit the charging voltage to comply with the maximum charging voltage of the Base Unit battery 206.

The barrel jack 210 contains an internal switch, such as a model CP-011A-ND as marketed by CUI Devices of Lake Oswego, Oreg., or other suitable device known in the art, and allows the solenoid controller circuit board 204 to be directly connected to the Foot Switch 110. This connection is made using the signal cabling 116 (shown in two halves on FIG. 4 and FIG. 5) which may be a simple dual-conductor cable 116A with a barrel connector 116B & 116C on each end. These barrel connectors 116B & 116C, such as model CP3-1001-ND as marketed by CUI Devices of Lake Oswego, Oreg., or other suitable device known in the art, mate with a Base Unit barrel jack 210 and a Foot Switch barrel jack 320. The signal cabling 116 is used to bypass the wireless circuitry, providing a convenient debug option and allowing the unit to respond faster. When the signal cabling 116 is plugged into the barrel jack 210, the wireless receiving circuit is disabled.

All electrical devices including the solenoid valves 200A and 200B, semiconductor devices, and other electrical components are selected generally at least to be compatible with the chosen source of power. Other embodiments of the invention might be powered by other means known in the art, and may vary in exact hardware used based on compatibility.

Referring now generally to the Figures and particularly to FIG. 5, FIG. 5 shows a Foot Switch circuitry 500 circuit diagram for one embodiment that includes a Foot Switch Transmitter 318, which comprises the momentary-contact pushbuttons 308A & 308B, an encoder module 502, a transmitter module 504, the barrel jack 320 for attachment of the signal cabling 116, the Foot Switch battery 318, and the Foot Switch antenna 114. The Foot Switch battery 318 may be a standard replaceable battery cell such as one or more AAA, AA, C, D, or 9v batteries one might keep around the house for smoke detectors, flashlights, and so on. The exact shape of the Foot Switch 110 casing may vary depending on which battery model may be preferred.

The encoder module 502 is a commercially available integrated circuit designed for low-voltage, remote-control applications such as a HT-12E as marketed by Holtek Semiconductor Inc. of Taipei, Taiwan, or any similar device. Similarly, the transmitter module 504 is a commercially available RF mini-PCB that broadcasts a low-power ASK-modulated signal in a 433 Mhz (or 315 Mhz) band such as a model FS1000A as marketed by the UCEC company of Arvada, Colo., or any suitable device known in the art. The encoder module 502 and transmitter module 504 are configured to work as a set: the encoder module 502 may output a serialized bit-stream that carries an address. This signal is input to the ASK transmitter and turned into a modulated broadcast signal. The encoder module 502 is triggered when either push-button 36A or 36B closes. The encoder module 502 and transmitter module 504 are designed for low voltage (e.g., 3 volts or less). The barrel jack 320 is used to bypass the wireless circuitry and connect the Foot Switch 110 directly to the solenoid controller circuit board 204. The barrel jack 320 contains an internal switch such as a model CP-6-ND as marketed by CUI Devices of Lake Oswego, Oreg., or other suitable device known in the art, such that when the cable 116 is connected the transmitter circuit is disabled. The Foot Switch battery 318 is not needed when the direct cable 116 connection is used.

Referring now generally to the Figures and particularly to FIG. 6 and FIG. 7, FIG. 6 and FIG. 7 are a pair of flowcharts presenting operation and toggling states of the Foot Switch 110 and Base Unit 108 respectively, in communicative interaction with each other.

When the Foot Switch 110 circuit is completed by a user pressing down on the actuator bar 300 and causing at least one pushbutton switch 308A and/or 308B to complete the parallel circuit, a Foot Switch transmitter 316 including the Foot Switch antenna 114 will transmit a first signal ("ENGAGE") to the Base Unit 108 signifying a water shutoff; when the Foot Switch 110 is released and the actuator bar 300 lifts off of the pressed pushbutton switch(es) 308A and/or 308B, the Foot Switch transmitter board 316 will send a second signal ("RELEASE") to the Base Unit 108 signaling that the water flow should be restored.

Beginning with FIG. 6, which represents the operation from the perspective of the Foot Switch 110, in step 6.00 the process begins; for instance, when the Foot Switch 110 is first powered on or the Foot Switch battery 318 replaced. The Foot Switch 110 sits there idle until pressed; in step 6.02, if the circuit is not closed, then in step 6.04, the wait continues. However, if the actuator bar 300 is pressed and at least one of the pushbutton switches 308A and/or 308B is pressed down and closes the circuit of the Foot Switch 110, in step 6.06, the Foot Switch 110 signals the Base Unit 108 with signal "ENGAGE", indicating that the Foot Switch 110 is in a down position and the flow of water should be halted in accordance with the method of the present invention. The Foot Switch 110 remains pressed as long as something is pressing down the actuator bar 300, such as a user's foot, and keeping the circuit closed; in step 6.08, if the circuit remains closed, there is no state change and the wait continues in step 6.10. However, if the circuit is no longer closed, i.e. if the user stopped pressing the actuator bar 300, then in step 6.12 the Base Unit 108 is sent signal "RELEASE", indicating that the Foot Switch 110 is no longer being pressed and the flow should be resumed in accordance with the invented method. The Foot Switch 110 now sits idle until pressed again in step 6.02. An unconnected end step 6.14 is included to emphasize that this is an infinite loop interrupted only by perhaps the occasional Foot Switch battery 318 change.

Regarding the corresponding flow chart of FIG. 7, which represents the same operation from the perspective of the Base Unit 108, the process begins at step 7.00, such as with the Base Unit 108 being newly connected to power and/or installed into a system. In step 7.02, if no signal is received from the Foot Switch 110, then in step 7.04 the Base Unit 108 is simply sitting there awaiting operation, with the solenoid valves 200A & 200B disengaged and the lines 102A & 102B flowing freely. However, if signal "ENGAGE" is received, in step 7.06 the Base Unit 108 engages the solenoid valves 200A & 200B to halt the flow in the lines 102A & 102B, in accordance with the method of the present invention. In step 7.08, until signal "RELEASE" is received, in step 7.10 the flow remains disabled; when signal "RELEASE" is received, indicating that the Foot Switch 110 is no longer being pressed, in step 7.12 the flow is restored, until a new "ENGAGE" signal may be received again in step 7.02. An unconnected end step 7.14 is included to emphasize that this is an infinite loop interrupted only by the occasional power outage or other loss of power connection.

The signals transmitted from the Foot Switch 110 to the Base Unit 108 might, as some non-limiting examples, consist of: different data packets signifying "ENGAGE" and "RELEASE"; a stream of 'pings' that starts when the Foot Switch 110 is pressed and stops when the Foot Switch 110 is released, such that signal "ENGAGE" is the first of the pings and signal "RELEASE" is the cessation of the pings; a single signal indicating 'flip to the opposite state', such that when flow is currently enabled the signal is understood as a signal "ENGAGE" and when flow is currently disabled the signal is understood as a signal "RELEASE"; or may be any other suitable format known in the art for two devices to signal one another. Considering the concern of multiple invented devices or other wireless devices being used within the same signal range (such as in multiple households in the same apartment building), the signals might also include encoding to distinguish them as coming from the Foot Switch 110 that corresponds to one particular Base Unit 108, such as an address or a serial number. Additionally, it is understood that the signals "ENGAGE" and "RELEASE" may be sent from the Foot Switch 110 to the Base Unit 108 wirelessly by means of these units' respective antennas 114 & 112, or non-wirelessly by means of the optional signal cabling 116 using these units' respective barrel jacks 320 & 210, or, potentially, by other signaling means as known in the art or invented in the future, which are not presented in the embodiments of the invention shown, but should be understood as further embodiments of the same invention that use different means for accomplishing the same basic task.

It should be understood that the present invention might be installed into any prior art plumbing system having compatible connections, and further embodiments of the present invention might include adaptations for compatibility with different models of plumbing fixtures. Any exact features of the prior art sink vanity cabinet 1 should not be construed as a limitation on the type of plumbing system suitable for inclusion of the present invention. Other suitable plumbing systems might, as non-limiting examples, have different sizes or shapes of pipes; contain more or fewer pipelines or different distinctions between them besides 'hot and cold'; transport liquids other than water; or be industrial plumbing applications rather than plumbing for a sink one might find in someone's home. A controllable valve has many and varied applications, which one skilled in the art will recognize and appreciate the example presented in the Figures as only one out of many possible applications.

The skilled person will understand that the descriptions above are for modules and equipment that is exemplary in nature, not limiting, and that there are a variety of changes that might be made within the scope of the invention. The length, for example of the floor Foot Switch 110 may vary, as long as it is long enough to accommodate the stance of a user, who may choose to use either foot to activate the system. There are a variety of solenoid valves that may work as well, and wireless operation may be accomplished in other ways than the examples described. For example, in one embodiment there may be just one solenoid-operated valve in the Base Unit, controlling just one water passage, for use in systems that do not accommodate both hot and cold water supply. There are many other changes that may be made within the scope of the invention. The invention is limited only by the claims that follow.

While selected embodiments have been chosen to illustrate the invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment, it is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

The invention claimed is:

1. A system comprising:
 a flow control module having at least one valve means for controlling water flow through a water supply pipe, a controller coupled with the at least one valve means, a wireless communications interface communicatively coupled with the controller, a control battery electrically coupled with the at least one valve means, the controller, and the wireless communications interface, and a flow powered generator electrically coupled with the control battery, wherein the at least one valve means comprises a normally open solenoid valve biased toward a default open position when not energized allowing a fluid to flow freely through the water supply pipe and when energized presents a closed position wherein the fluid flow is inhibited;

the flow powered generator is positioned within a plumbing network and is configured to generate electrical energy by conversion from a hydraulic force received from a fluid motion directed within the plumbing network;

a foot switch comprising an actuator bar coupled with a foot switch circuitry, wherein the actuator bar transitions from a quiescent position to a signaling position during application of an urging force;

the foot switch circuitry comprising a pair of sensors positioned to receive pressure from the actuator bar, a transmitting wireless communications interface adapted to inform the flow control module of a detection of the urging force received from the actuator bar by either sensor of the pair of sensors, and a battery electrically coupled with the switch circuitry and the transmitting wireless communications interface, wherein when a pressure is applied to the actuator bar to transition from the quiescent position state to the signaling position state the switch circuitry causes the transmitting wireless communications interface to transmit a signal that when received by the wireless communications interface of the flow control module directs the controller to energize the at least one valve means to transition from the open position to the closed position, and in the absence of energizing by the controller the at least one valve means to return to the default open position.

2. The system of claim 1, wherein the flow powered generator is coupled with the water supply pipe.

3. The system of claim 1, wherein the water supply pipe is comprised within the plumbing system.

4. The system of claim 1, further comprising a detachable signal cabling configured to communicatively couple the flow control module and the foot switch circuitry whereby a detection of a signaling position of the actuator bar is communicated by the foot switch to the controller.

5. The system of claim 4, wherein wireless communications to the fluid control module are disabled when the detachable signal communicatively couples the flow control module with the foot switch circuitry.

6. The system of claim 1, wherein the foot switch further comprises two separate feet movably coupled with the actuator bar, whereby each of the two separate feet are separately positionable on differing surfaces.

7. The system of claim 1, wherein the foot switch further comprises two separate feet movably coupled with the foot switch, whereby each of the two separate feet are separately positionable on differing surfaces.

8. A system comprising:
a flow control module having at least one valve means for controlling water flow through a water supply pipe, a controller coupled with the at least one valve means, a wireless communications interface communicatively coupled with the controller, a power source coupled with the at least one valve means, the controller and the wireless communications interface communicatively, wherein the at least one valve means comprises a normally open solenoid valve biased toward a default open position when not energized allowing a fluid to flow freely through the water supply pipe and when energized presents a closed position wherein the fluid flow is inhibited;

a foot switch comprising an actuator bar coupled with a foot switch circuitry;

the actuator bar alternatively presenting a quiescent position and a signaling position, wherein the actuator bar transitions from the quiescent position to the signaling position during application of an urging force;

the foot switch circuitry comprising a pair of sensors positioned to receive pressure from the actuator bar, a transmitting wireless communications interface adapted to inform the flow control module of a detection of the urging force received from the actuator bar by either sensor of the pair of sensors, and a battery electrically coupled with a switch circuitry and the transmitting wireless communications interface, and wherein when a pressure is applied to the actuator bar to transition from the quiescent position state to the signaling position state the switch circuitry causes the transmitting wireless communications interface to transmit a signal that when received by the wireless communications interface of the flow control module directs the controller to energize the at least one valve means to transition from the open position to the closed position, and in the absence of energizing by the controller the at least one valve means to return to the default open position.

9. The system of claim 8, wherein the power source is a flow powered generator positioned within a plumbing network and configured to generate electrical energy by conversion from a hydraulic force received from a fluid motion directed within the plumbing network.

10. The system of claim 9, wherein the flow powered generator is coupled with the water supply pipe.

11. The system of claim 9, wherein the water supply pipe is comprised within the plumbing system.

12. The system of claim 8, further comprising a detachable signal cabling configured to communicatively couple the controller of the flow control module and the foot switch circuitry whereby a detection of a signaling position of the actuator bar is communicated by the foot switch to the controller.

13. The system of claim 12, wherein wireless communications to the fluid control module are disabled when the detachable signal communicatively couples the flow control module with the foot switch circuitry.

14. The system of claim 8, wherein the foot switch further comprises two separate feet movably coupled with the actuator bar, whereby each of the two separate feet are separately positionable on differing surfaces.

15. The system of claim 8, wherein the foot switch further comprises two separate feet movably coupled with the foot switch, whereby each of the two separate feet are separately positionable on differing surfaces.

\* \* \* \* \*